United States Patent
Xie et al.

(10) Patent No.: US 11,342,744 B2
(45) Date of Patent: May 24, 2022

(54) MULTI-VOLTAGE LEVEL DIRECT CURRENT GRID SYSTEM AND CONTROL PROTECTION METHOD

(71) Applicants: NR ELECTRIC CO., LTD, Jiangsu (CN); NR ENGINEERING CO., LTD, Jiangsu (CN)

(72) Inventors: Yeyuan Xie, Jiangsu (CN); Haiying Li, Jiangsu (CN); Yu Wang, Jiangsu (CN); Zhongfeng Zhang, Jiangsu (CN); Dongming Cao, Jiangsu (CN)

(73) Assignees: NR ELECTRIC CO., LTD, Jiangsu (CN); NR ENGINEERING CO., LTD, Jiangsu (CN)

(*) Notice: Subject to any disclaimer, the term of this patent is extended or adjusted under 35 U.S.C. 154(b) by 0 days.

(21) Appl. No.: 17/251,274

(22) PCT Filed: Apr. 1, 2019

(86) PCT No.: PCT/CN2019/080864
§ 371 (c)(1),
(2) Date: Dec. 11, 2020

(87) PCT Pub. No.: WO2019/237794
PCT Pub. Date: Dec. 19, 2019

(65) Prior Publication Data
US 2021/0265835 A1    Aug. 26, 2021

(30) Foreign Application Priority Data
Jun. 13, 2018  (CN) .......................... 201810606794.4

(51) Int. Cl.
*H02H 9/02*    (2006.01)
*H02H 7/26*    (2006.01)
(Continued)

(52) U.S. Cl.
CPC ............ *H02H 9/02* (2013.01); *H02H 1/0007* (2013.01); *H02H 7/268* (2013.01); *H02J 1/082* (2020.01)

(58) Field of Classification Search
CPC ... H02H 7/268; H02H 9/02; H02J 1/00; H02J 1/082
See application file for complete search history.

(56) References Cited

U.S. PATENT DOCUMENTS 7,952,899 B2    5/2011  Jacques et al.
10,284,110 B2*  5/2019  Mnich ................... H02M 7/797
(Continued)

FOREIGN PATENT DOCUMENTS

| CN | 101383578 A | 3/2009 |
| CN | 104375039 A | 2/2015 |

(Continued)

OTHER PUBLICATIONS

Translation of CN107046278. Aug. 15, 2017. (Year: 2017).*
(Continued)

*Primary Examiner* — Jared Fureman
*Assistant Examiner* — Christopher J Clark
(74) *Attorney, Agent, or Firm* — Li & Cai Intellectual Property (USA) Office

(57) ABSTRACT

A multi-voltage level direct current grid system and a control protection method, the direct current grid system comprising: at least two direct current buses; at least one direct current transformer, one end of which is connected to a first direct current bus while another end is connected to a second direct current bus or a lead-out wire, which may achieve direct current voltage conversion; and at least one lead-out wire current limiter, one end of the lead-out wire current limiter being connected to the second direct current bus while another end is connected to the lead-out wire; the (Continued)

lead-out wire current limiter comprises a first current-limiting unit, and the first current limiting unit comprises a group of direct current switches, as well as a first bypass switch and a first current-limiting resistor unit that are connected in parallel.

14 Claims, 3 Drawing Sheets

(51) Int. Cl.
  *H02J 1/08* (2006.01)
  *H02H 1/00* (2006.01)

(56) References Cited

U.S. PATENT DOCUMENTS

| | | | |
|---|---|---|---|
| 2009/0154201 | A1 | 6/2009 | Ecrabey et al. |
| 2015/0070939 | A1* | 3/2015 | Gupta ............... H02M 3/33507 363/17 |
| 2016/0082907 | A1 | 3/2016 | Dong et al. |
| 2016/0359319 | A1* | 12/2016 | Kolhatkar ............... H02H 9/02 |
| 2017/0054291 | A1* | 2/2017 | Qi ............... H02H 3/025 |
| 2020/0127453 | A1* | 4/2020 | Creusot ............... H01H 33/596 |

FOREIGN PATENT DOCUMENTS

| | | |
|---|---|---|
| CN | 206211547 U | 5/2017 |
| CN | 107046278 A | 8/2017 |
| CN | 107196287 A | 9/2017 |
| CN | 107634541 A | 1/2018 |
| CN | 207166122 U | 3/2018 |
| CN | 107947173 A | 4/2018 |
| CN | 108879623 A | 11/2018 |
| EP | 2910959 A1 | 8/2015 |
| JP | H04368459 A | 12/1992 |
| JP | H0670457 A | 3/1994 |
| JP | 2011135628 A | 7/2011 |
| KR | 20110110894 A | 10/2011 |
| RU | 2124257 C1 | 12/1998 |
| RU | 2319298 C1 | 3/2008 |
| WO | WO 2015121983 A1 | 8/2015 |
| WO | 2016042601 A1 | 3/2016 |

OTHER PUBLICATIONS

WIPO, International Search Report dated May 24, 2019.
China Patent Office, Office action regarding Chinese patent application No. CN 2018106067944.
European Patent Office, European Search Report dated Jun. 30, 2021.
Russia Patent Office, Acceptance Decision dated Aug. 16, 2021.
Japan Patent Office, Notice of Reasons for Refusal dated Feb. 8, 2022.

* cited by examiner

MULTI-VOLTAGE LEVEL DIRECT CURRENT GRID SYSTEM AND CONTROL PROTECTION METHOD

TECHNICAL FIELD

The present application belongs to the field of power electronic converters, and particularly relates to a multi-voltage level direct current grid system and a control protection method.

BACKGROUND

In recent years, direct current grids are being used more and more widely. Due to the introduction of a large number of power electronic converters in the direct current grids, the direct current grids can operate more flexibly, but become more complicated. How to effectively guarantee the operating reliability of the direct current grids has become a bottleneck restraining the development of the direct current grids.

The inventor finds that due to the small line impedance of direct current systems, once a short-circuit fault occurs, the short-circuit current will increase extremely quickly and damage or lock up the power electronics converters composed of power conductor devices with a limited over-current capacity. On the other hand, the short-circuit current caused by a short-circuit fault happening to lead-out wires will reduce the voltage of direct current buses, which in turn impacts all device and loads thereon. Thus, it is necessary to take measures to limit the short-circuit current and stabilize the voltage of the direct current buses in a fault to minimize the impact of the fault.

SUMMARY

The present invention aims to overcome the defects of the above-mentioned solution by providing a multi-voltage level direct current grid system and a control protection method. By means of increasing the input of current-limiting resistor units, lowering the current change rate and matching resistor resistances, the voltage of direct current buses stabilized, a fault can be rapidly eliminated, and the reliability of the direct current grid is greatly improved.

An embodiment of the present application provides a multi-voltage level direct current grid system, which is characterized by comprising at least two direct current buses, at least one direct current transformer having an end connected to a first direct current bus and another end connected to a second direct current bus or a lead-out wire to achieve direct current voltage conversion, and at least one lead-out wire current limiter having an end connected to the second direct current bus and another end connected to the lead-out wire and comprising a first current-limiting unit, wherein the first current-limiting unit comprises a group of direct current switches, and a first bypass switch and a first current-limiting resistor unit which are connected in parallel.

Furthermore, the direct current transformer comprises a direct current conversion unit to achieve direct current voltage conversion.

Furthermore, the direct current transformer further comprises a second current-limiting unit and a third current-limiting unit, wherein the second current-limiting unit comprises a second bypass switch and a second current-limiting resistor unit which are connected in parallel, the third current-limiting unit comprises a third bypass switch and a third current-limiting resistor unit which are connected in parallel, and the second current-limiting unit and the third current-limiting unit are connected in series to two ends of the direct current conversion unit respectively.

Furthermore, the first current-limiting resistor unit comprises multiple branches, or the first current-limiting resistor unit, the second current-limiting unit and the third current-limiting unit comprise multiple branches, each of the branches comprises a selector switch and a resistor connected in series, and resistance of each of the first current-limiting resistor unit, the second current-limiting unit and the third current-limiting resistor unit can be adjusted by controlling on-off of the selector switch.

As an optional solution, the first bypass switch comprises two power semiconductor switch devices connected in series-opposing and having anti-parallel diodes.

As an optional solution, the first bypass switch comprises a quick mechanical contactor.

Furthermore, the first current-limiting resistor unit of the lead-out wire current limiter will be put into operation when a short-circuit fault happens to a lead-out side of a corresponding wire, so as to decrease the fault current of the wire to be close to a set value.

Furthermore, the first current-limiting resistor unit of the lead-out wire current limiter will not be put into operation when a short-circuit fault happens to lead-out sides of other wires.

Furthermore, the second current-limiting resistor unit or the third current-limiting resistor unit of the direct current transformer will be put into operation when a short-circuit fault happens to the bus connected thereof, so as to avoid over-current of the direct current transformer.

Furthermore, the second current-limiting resistor unit and the third current-limiting resistor unit of the direct current transformer will not be put into operation when a short-circuit fault happens to a lead-out side of a wire.

An embodiment of the present application further provides a control protection method of the multi-voltage level direct current grid system, which is characterized by comprising the following steps when a short-circuit fault happens to a lead-out wire in a direct current grid: when a fault current value exceeding a current-limiting action threshold is detected, turning off a bypass switch of the lead-out wire current limiter corresponding to a faulted lead-out wire and putting a first current-limiting resistor unit into operation to limit a fault current and maintain it at a set value; enabling over-current protection corresponding to the lead-out wire to act; and turning off a direct current switch of the lead-out wire current limiter to remove a fault point.

As an optional solution, before the over-current protection corresponding to the lead-out wire acts, the method further comprises the following steps: detecting the voltage of a direct current bus connected to the faulted lead-out wire; remaining a control strategy of the direct current transformer connected to the direct current bus unchanged when the voltage is within a normal range; carrying out, by the direct current transformer connected to the direct current bus, closed-loop control on a direct current voltage when the voltage exceeds a certain range.

Furthermore, in the step of putting the first current-limiting resistor unit into operation to limit a fault current and maintain it at a set value, an equivalent resistance of the first current-limiting resistor unit put into operation is calculated according to a current value before the fault and a set over-current protection value, and an actual input resistance is made to be close to the equivalent resistance by controlling on-off of the selector switch of the first current-limiting resistor unit.

The present application further provides a control protection method of the multi-voltage level direct current grid system, which is characterized by comprising the following steps when a direct current transformer connected to a faulted bus detects that a fault current value exceeds a current-limiting action threshold, turning off a second bypass switch or/and a third bypass switch of the direct current transformer connected to the faulted bus to put the second current-limiting resistor unit or/and the third current-limiting resistor unit into operation; switching a control strategy of the direct current transformer to a current-limiting mode, that is, maintaining a current before the fault; if the fault is detected to be disappeared and a voltage of a direct current bus is detected to be returned to a normal range, switching the direct current transformer to a normal control mode; or if the fault is detected to be exist after a period of time, determining the fault as a permanent fault, locking up a power semiconductor device in a direct current conversion unit of the direct current transformer, and uploading the fault.

According to the technical solutions provided by the embodiments of the present application, by means of increasing the input of the current-limiting resistor unit and lowering the fault current change rate, the protection of devices in the direct current grid is facilitated; during a fault, the direct current transformer may not be locked up, which facilitates rapid recovery of the system once the fault is eliminated.

BRIEF DESCRIPTION OF THE DRAWINGS

To more clearly explain the technical solutions of the embodiments of the present application, drawings used for describing the embodiments are briefly introduced below. Obviously, the drawings in the following description are merely for illustrating some embodiments of the present application. Those ordinarily skilled in the art can obtain other drawings according to the following ones without creative labor.

DETAILED DESCRIPTION OF EMBODIMENTS

To make the purposes, technical solutions and advantages of the embodiments of the present application clearer, specific implementations of the technical solutions of the present application will be more clearly explained in further detail in conjunction with the accompanying drawings and embodiments. Obviously, the specific implementations and embodiments in the following description are merely for the purpose of explaining the present application, and are not intended to limit the present application. The following embodiments are only illustrative ones, and are not all possible ones of the present application. All other embodiments obtained by those skilled in the field on the basis of different transformations to the present application should also fall within the protection scope of the present application.

Figure 1:
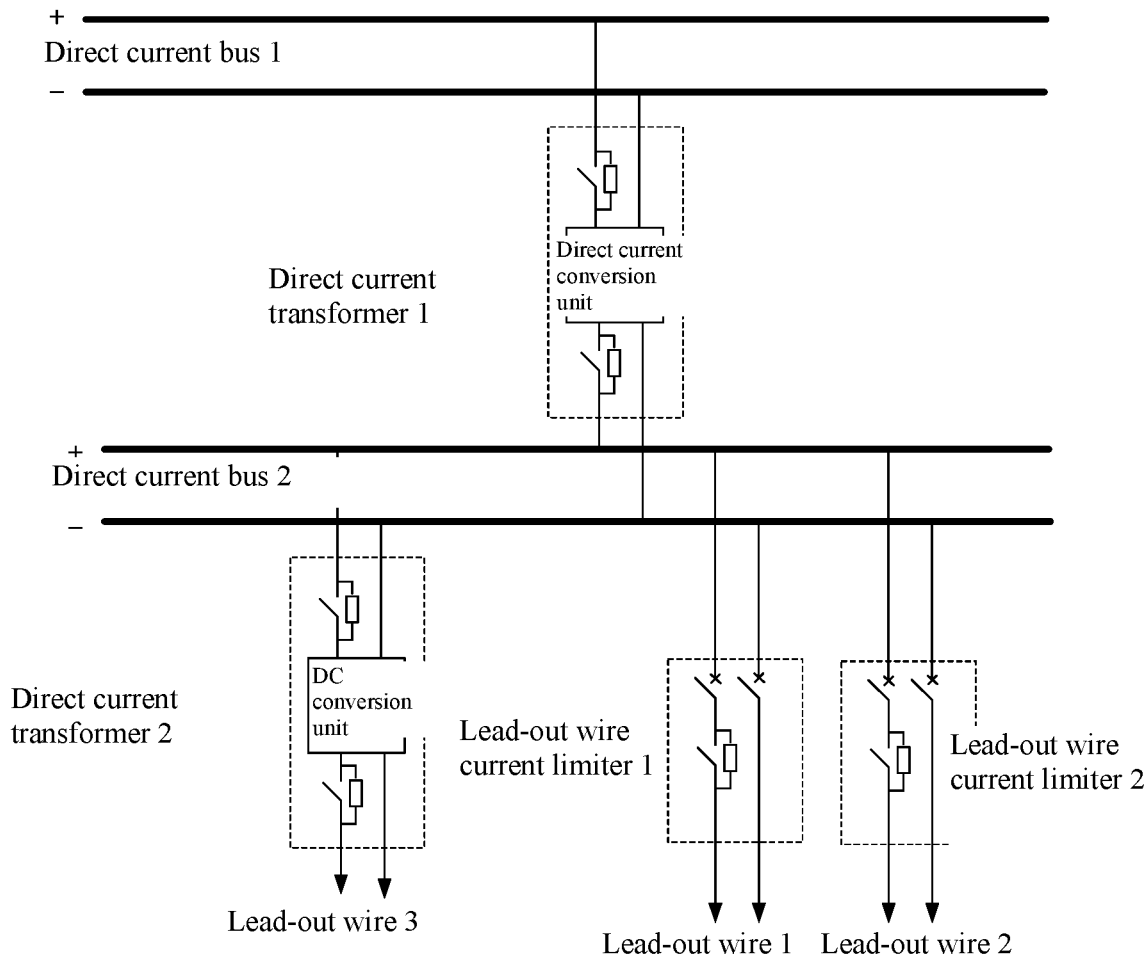
FIG. 1 is a component diagram of a multi-voltage level direct current grid system provided by one embodiment of the present application.

FIG. 1 is a component diagram of a multi-voltage level direct current grid system provided by one embodiment of the present application. As shown in FIG. 1, the multi-voltage level direct current grid system comprises two direct current transformers, two direct current buses, two lead-out wire current limiters and three lead-out wires.

One end of a direct current transformer 1 is connected to a direct current bus 1, and the other end of the direct current transformer 1 is connected to a direct current bus 2, such that direct current voltage conversion may be achieved. One end of a direct current transformer 2 is connected to the direct current bus 2, and the other end of the direct current transformer 2 is connected to a lead-out wire 3, such as direct current voltage conversion may be achieved. One end of a lead-out wire current limiter 1 is connected to the direct current bus 2, and the other end of the lead-out wire current limiter 1 is connected to a lead-out wire 1. One end of a lead-out wire current limiter 2 is connected to the direct current bus 2, and the other end of the lead-out wire current limiter 2 is connected to a lead-out wire 2.

Figure 2:
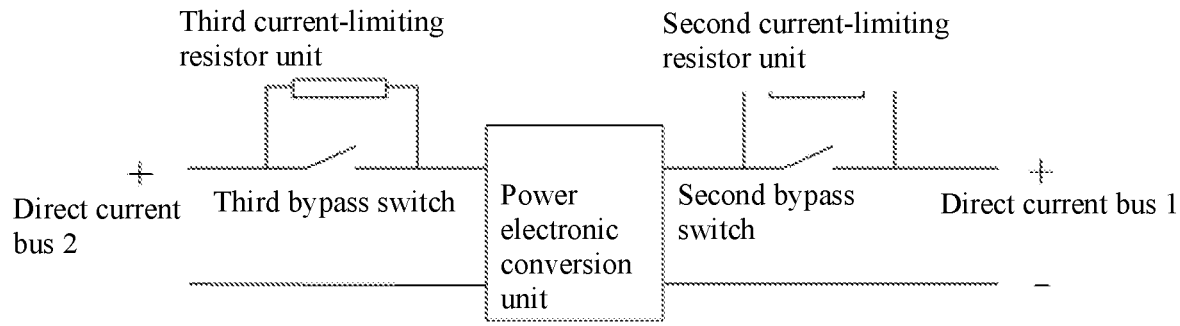
FIG. 2 is a component diagram of a direct current transformer provided by one embodiment of the present application.

FIG. 2 is a component diagram of a direct current transformer provided by one embodiment of the present application. As shown in FIG. 2, the direct current transformer comprises a direct current conversion unit, a second current-limiting unit and a third current-limiting unit.

Figure 5:
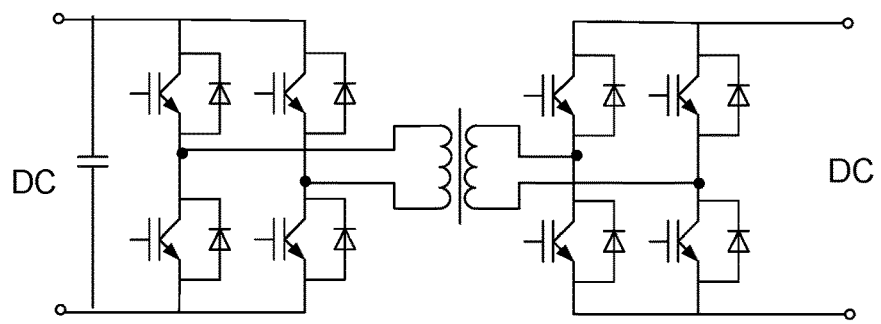
FIG. 5 is a component diagram of a direct current conversion unit provided by one embodiment of the present application.

FIG. 5 is a component diagram of a direct current conversion unit provided by one embodiment of the present application. As shown in FIG. 5, the direct current conversion unit may achieve direct current voltage conversion by means of a power electronic conversion unit. The direct current conversion unit comprises two H-bridges and implements a direct current conversion function by means of DC-AC and AC-DC.

The second current-limiting unit comprises a second bypass switch and a second current-limiting resistor unit which are connected in parallel. The third current-limiting unit comprises a third bypass switch and a third current-limiting resistor unit which are connected in parallel. The second current-limiting unit and the third current-limiting unit are connected in series to two ends of the direct current conversion unit respectively.

The second current-limiting resistor unit and the third current-limiting resistor unit each comprise multiple branches, and each branch comprises a selector switch and a resistor which are connected in series. The resistances of the current-limiting resistor units can be adjusted by controlling on-off of the selector switches.

Wherein, the second current-limiting resistor unit and the third current-limiting resistor unit of the direct current transformer will be put into operation when a short-circuit fault happens to the bus connected thereof, so as to avoid over-current of the direct current transformer. The second current-limiting resistor unit and the third current-limiting resistor unit of the direct current transformer will not be put into operation when a short-current fault happens to a lead-out side of a wire.

Figure 3:
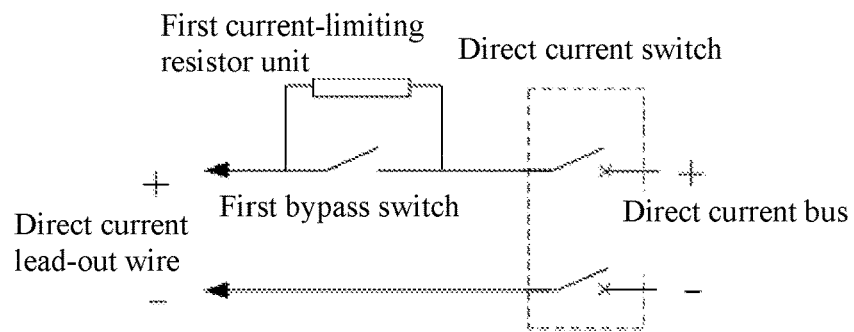
FIG. 3 is a component diagram of a lead-out wire current limiter provided by one embodiment of the present application.

FIG. 3 is a component diagram of a lead-out wire current limiter provided by one embodiment of the present application. As shown in FIG. 3, the lead-out wire current limiter comprises a first current-limiting unit, and the first current-limiting unit comprises a group of direct current switches, and a first bypass switch and a first current-limiting resistor unit which are connected in parallel. The first current-limiting resistor unit comprises multiple branches, and each branch comprises a selector switch and a resistor which are connected in series. The resistance of the first current-limiting resistor unit can be adjusted by controlling on-off of the selector switch.

Wherein, the direct current switches can turn off direct currents. The equivalent resistances of the current-limiting resistor units may be identical or different.

The first current-limiting resistor unit of the lead-out wire current limiter will be put into operation when a short-circuit fault happens to the lead-out side of the corresponding wire, and after the first current-limiting resistor unit is put into operation, the fault current of this wire will be decreased to be close to a set value. The first current-limiting resistor unit of the lead-out wire current limit will not be put into operation when a short-circuit fault happens to the lead-out side of other wires.

Figure 4:
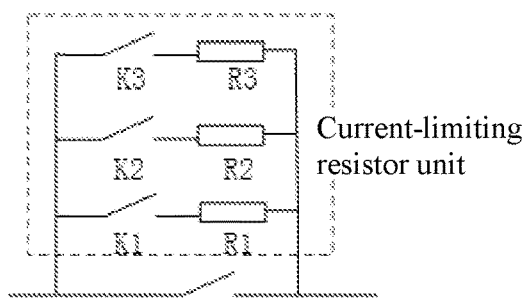
FIG. 4 is a component diagram of a current-limiting resistor unit provided by one embodiment of the present application.

FIG. 4 is a component diagram of a current-limiting resistor unit provided by one embodiment of the present application. As shown in FIG. 4, the current-limiting resistor unit in this embodiment comprises three branches, each branch comprises a selector switch and a resistor, and the resistance of each resistor is 60Ω; when K1, K2 and K3 are turned on, the equivalent resistance is 20Ω; when two of K1, K2 and K3 are turned on, the equivalent resistance is 30Ω; when only one switch is turned on, the equivalent resistance is 60Ω.

Figure 6:
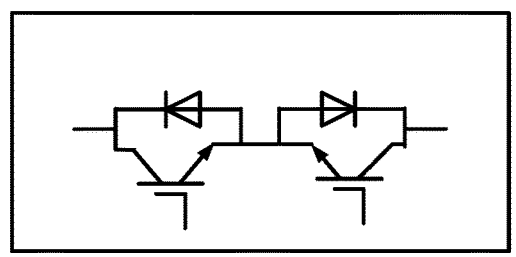
FIG. 6 is a component diagram of a bypass switch provided by one embodiment of the present application.

FIG. 6 is a component diagram of a bypass switch provided by one embodiment of the present application. As shown in FIG. 6, the bypass switch comprises two power semiconductor switch devices which are in series-opposing connection and are provided with anti-parallel diodes.

Wherein, each bypass switch may be a quick mechanical contactor, and the present application has no limitation in this aspect.

An embodiment of the present application further provides a control protection method of the multi-voltage level direct current grid system. When a short-circuit fault happens to a lead-out wire in a direct current grid, the control protection method comprises the following steps:

Step 110: when it is detected that a fault current value exceeds a current-limiting action threshold, the bypass switch of the corresponding lead-out wire current limiter is turned off and to put the first current-limiting resistor unit into operation to limit a fault current and maintain it at a set value.

Step 120: over-current protection of the corresponding lead-out wire acts.

Step 130: the direct current switch of the corresponding lead-out wire current limiter is turned off to remove a fault point.

Wherein, in Step 110, the equivalent resistance of the first current-limiting resistor unit put into operation is calculated according to a current value before the fault and a set over-current protection value, and an actual input resistance is made to be close to the calculated resistance by controlling on-off of the selector switch of the first current-limiting resistor unit.

An embodiment of the present application further provides another control protection method of the multi-voltage level direct current grid system. When a short-circuit fault happens to a lead-out wire in a direct current grid, the control protection method comprises the following steps:

Step 110: when it is detected that a fault current value exceeds a current-limiting action threshold, the bypass switch of the corresponding lead-out wire current limiter is turned off to put the first current-limiting resistor unit into operation to limit a fault current and maintain it at a set value.

Step 111: the voltage of the direct current bus connected to the faulted lead-out wire is detected.

Step 112: if the voltage is within a normal range, a control strategy of the direct current transformer connected to the direct current bus remains unchanged.

Step 113: when the voltage exceeds a certain range, the direct current transformer connected to the direct current bus carries out closed-loop control on the direct current voltage.

Step 120: over-current protection corresponding to the lead-out wire acts.

Step 130: the direct current switch of the corresponding lead-out wire current limiter is turned off to remove a fault point.

Wherein, in Step 110, the equivalent resistance of the first current-limiting resistor unit put into operation is calculated according to a current value before the fault and a set over-current protection value, and an actual resistance is made close to the calculated resistance by controlling on-off of the selector switch of the first current-limiting resistor unit.

Figure 7:
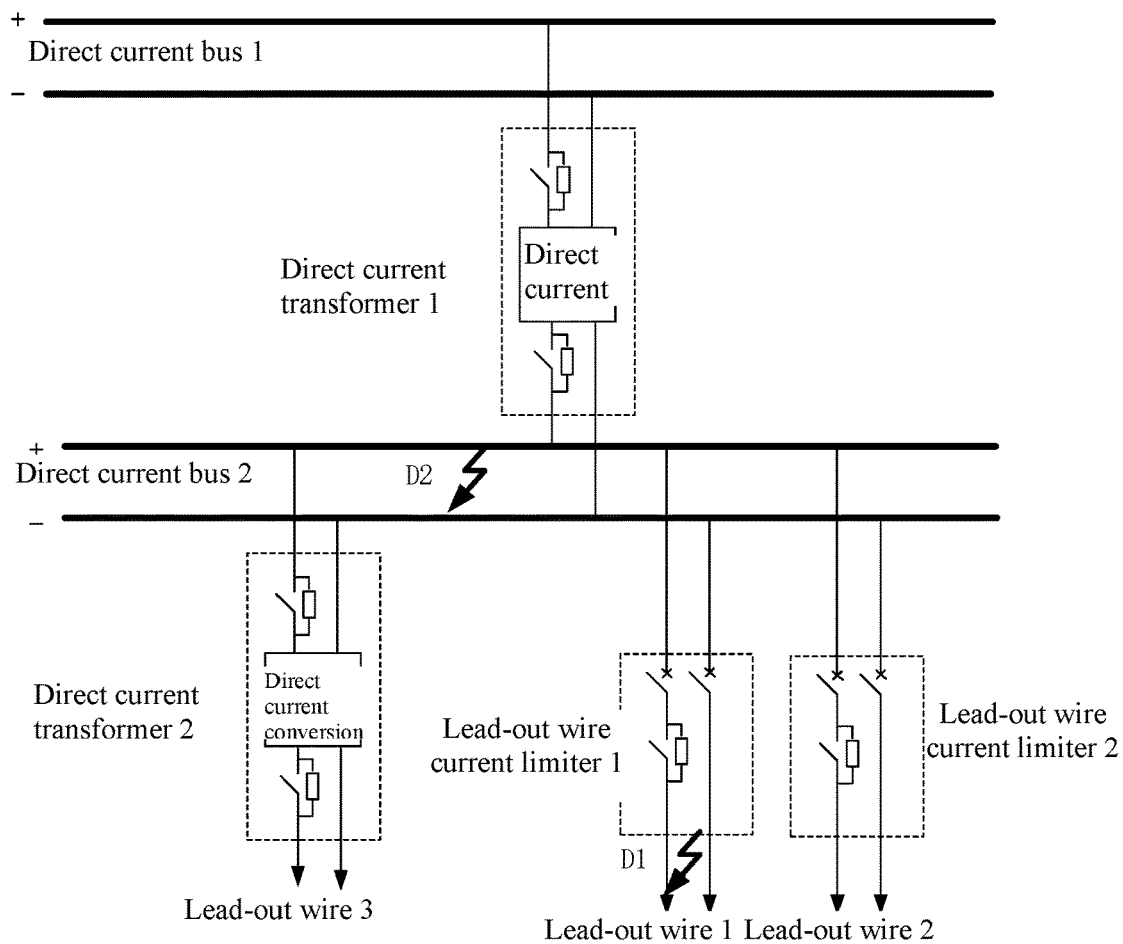
FIG. 7 is a distribution diagram of fault points in a direct current grid provided by one embodiment of the present application.

For example, as shown in FIG. 7, when the fault point is D1, a fault happens to a lead-out wire. In this embodiment, the supply voltage is 10.5 kV, the system impedance is 0.5Ω, and the first current-limiting resistor unit is as shown in FIG. 4.

If a current-limiting resistor is not put into operation when the fault occurs, the direct current voltage of the second direct current bus near the fault point is 0, the voltage of the whole bus will drop, and fault ride-through cannot be realized.

Figure 8:
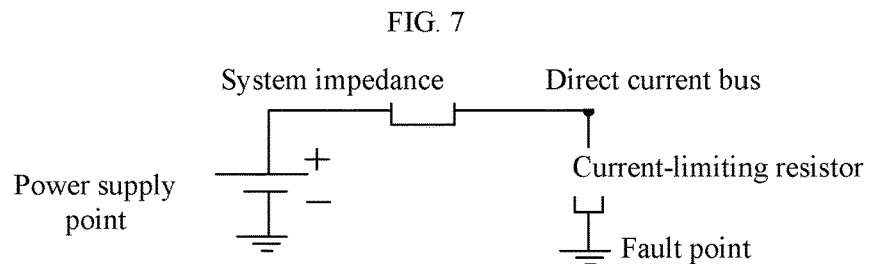
FIG. 8 is an equivalent circuit diagram during a fault happening to a direct current lead-out wire, provided by one embodiment of the present application.

As shown in FIG. 8, after the current-limiting resistor is put into operation, the voltage of the second direct current bus near the fault point is 10.5×R (R+0.5); when the resistance of the resistor put into operation is 30Ω, the direct current voltage is 10.3 kV and has a less than 2% deviation against a normal voltage, so that the voltage of the direct current bus is stabilized in the fault.

Finally, over-current protection of the lead-out wire 1 acts, and the direct current switch of the corresponding lead-out wire current limiter is turned off to remove the fault point.

When a fault happens to a bus in the direct current grid, the control protection method comprises the following steps:

Step 310: when the direct current transformer connected to the faulted bus detects that a fault current value exceeds a current-limiting action threshold, the bypass switch is turned off to put the second current-limiting resistor unit or the third current-limiting resistor unit connected to the faulted bus into operation.

Step 320: the control strategy of the direct current transformer is switched to a current-limiting mode, that is, the current before the fault is maintained.

Step 330: if it is detected that the fault disappears and the voltage of the direct current bus returns to the normal range, the direct current transformer is switched to a normal control mode.

Step 340: if the fault still exits after a period of time, the fault is determined as a permanent fault, the power semiconductor devices in the direct current conversion unit of the direct current transformer are locked up, and the fault is uploaded.

For example, as shown in FIG. 7, when the fault point is D2, a short-circuit fault happens to the direct current bus 2, and in this case, the direct current transformer 1 and the direct current transformer 2 will detect an over-current, and the voltage of the direct current bus 2 will drop to be close to 0.

If no current-limiting resistor unit is configured in the direct current transformer, the over-current will cause over-current trip-out or damage to the direct current transformer. In this embodiment, the direct current transformer 1 will rapidly turn off the third bypass switch and put the third current-limiting resistor unit into operation, the direct current transformer 2 will rapidly turn off the second bypass switch and put the second current-limiting resistor unit into operation, and the output current of the direct current transformer can be kept consistent with the current before the fault by means of the current-limiting resistor and an adjustment of the control strategy of the direct current transformer.

Figure 9:
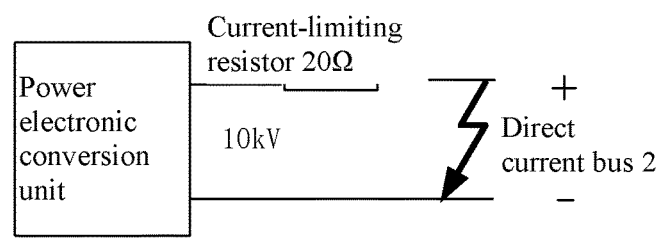
FIG. 9 is an equivalent circuit diagram during a fault happening to a direct current bus, provided by another embodiment of the present application.

As shown in FIG. 9, when the voltage of the bus is 0, the resistance of the resistor put into operation is 20Ω, the output voltage is 10 kV, and the current can be limited to 500A.

Trip-out will not be caused by the fault. If the fault D2 is a transient fault, the system will rapidly return to normal after the fault disappears, and thus, fault ride-through is realized.

It should be noted that the embodiments described above with reference to the accompanying drawings are merely for explaining the present application, and are not intended to limit the scope of the present application. Those ordinarily skilled in the art would appreciate that all modifications or equivalent substitutions made to the present application without departing from the spirit and scope of the present application should also fall within the scope of the present application. In addition, unless otherwise specified in the specification, terms in the singular form may also be in the plural form, and vice versa. Moreover, unless otherwise specifically stated, one part or all of any embodiment can be combined with one part or all of any other embodiments to be implemented.

What is claimed is:

1. A multi-voltage level direct current grid system, comprising:
   at least two direct current buses;
   at least one direct current transformer having an end connected to a first direct current bus and another end connected to a second direct current bus or a lead-out wire to achieve direct current voltage conversion; and
   at least one lead-out wire current limiter having an end connected to the second direct current bus and another end connected to a lead-out wire and comprising a first current-limiting unit, wherein the first current-limiting unit comprises a group of direct current switches, and a first bypass switch and a first current-limiting resistor unit connected in parallel;
   wherein the direct current transformer further comprises:
   a second current-limiting unit comprising a second bypass switch and a second current-limiting resistor unit connected in parallel; and
   a third current-limiting unit comprising a third bypass switch and a third current-limiting resistor unit connected in parallel, wherein the second current-limiting unit and the third current-limiting unit are connected in series to two ends of the direct current conversion unit, respectively.

2. The multi-voltage level direct current grid system according to claim 1, wherein the direct current transformer comprises a direct current conversion unit to achieve direct current voltage conversion.

3. The multi-voltage level direct current grid system according to claim 1, wherein each current-limiting resistor unit comprises multiple branches, each of the branches comprises a selector switch and a resistor connected in series, and resistance of each current-limiting resistor unit can be adjusted by controlling on-off of the selector switch.

4. The multi-voltage level direct current grid system according to claim 1, wherein each bypass switch comprises two power semiconductor switch devices connected in series-opposing and having anti-parallel diodes.

5. The multi-voltage level direct current grid system according to claim 1, wherein each bypass switch comprises a quick mechanical contactor.

6. The multi-voltage level direct current grid system according to claim 1, wherein the first current-limiting resistor unit of the lead-out wire current limiter is put into operation when a short-circuit fault happens to a lead-out side of a corresponding wire, so as to decrease a fault current of the wire to be close to a set value.

7. The multi-voltage level direct current grid system according to claim 1, wherein the first current-limiting resistor unit of the lead-out wire current limiter is not put into operation when a short-circuit fault happens to lead-out sides of other wires.

8. The multi-voltage level direct current grid system according to claim 1, wherein the second current-limiting resistor unit or the third current-limiting resistor unit of the direct current transformer is put into operation when a short-circuit fault happens to the bus connected thereto, so as to avoid over-current of the direct current transformer.

9. The multi-voltage level direct current grid system according to claim 1, wherein the second current-limiting resistor unit and the third current-limiting resistor unit of the direct current transformer is not put into operation when a short-circuit fault happens to a lead-out side of a wire.

10. A control protection method of the multi-voltage level direct current grid system according to claim 1, comprising the following steps when a short-circuit fault happens to a lead-out wire in a direct-current grid:
    when a fault current value exceeding a current-limiting action threshold is detected, turning off a bypass switch of the lead-out wire current limiter corresponding to a faulted lead-out wire and putting a first current-limiting resistor unit into operation to limit a fault current and maintain the fault current at a set value;
    enabling over-current protection corresponding to the lead-out wire to act; and
    turning off a direct current switch of the lead-out wire current limiter to remove a fault point.

11. The method according to claim 10, wherein before the over-current protection corresponding to the lead-out wire acts, the method further comprises:
    detecting a voltage of a direct current bus connected to the faulted lead-out wire;

remaining a control strategy of the direct current transformer connected to the direct current bus unchanged when the voltage is within a normal range; and carrying out, by the direct current transformer connected to the direct current bus, closed-loop control on a direct current voltage when the voltage exceeds a certain range.

12. The method according to claim 10, wherein in the step of putting the first current-limiting resistor unit into operation to limit a fault current and maintain the fault current at a set value, an equivalent resistance of the first current-limiting resistor unit put into operation is calculated according to a current value before the fault and a set over-current protection value, and an actual input resistance is made to be close to the equivalent resistance by controlling on-off of a selector switch of the first current-limiting resistor unit.

13. A control protection method of the multi-voltage level direct current grid system according to claim 1, comprising the following steps when a fault happens to a bus in a direct current grid:

when a direct current transformer connected to a faulted bus detects that a fault current value exceeds a current-limiting action threshold, turning off a second bypass switch or/and a third bypass switch of the direct current transformer connected to the faulted bus to put the second current-limiting resistor unit or/and the third current-limiting resistor unit into operation;

switching a control strategy of the direct current transformer to a current-limiting mode to maintain a current before the fault;

if the fault is detected to have disappeared and a voltage of a direct current bus is detected to have returned to a normal range, switching the direct current transformer to a normal control mode; and if the fault is detected to exist after a period of time, determining the fault as a permanent fault, locking up a power semiconductor device in a direct current conversion unit of the direct current transformer, and uploading the fault.

14. The multi-voltage level direct current grid system according to claim 1, wherein each current-limiting resistor unit comprises multiple branches, each of the branches comprises a selector switch and a resistor connected in series, and resistance of each current-limiting resistor unit can be adjusted by controlling on-off of the selector switch.

* * * * *